United States Patent
Aimoto

(10) Patent No.: US 8,072,885 B2
(45) Date of Patent: Dec. 6, 2011

(54) TRAFFIC SHAPING CIRCUIT, TERMINAL DEVICE AND NETWORK NODE

(75) Inventor: Takeshi Aimoto, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 107 days.

(21) Appl. No.: 12/025,208

(22) Filed: Feb. 4, 2008

(65) Prior Publication Data

US 2008/0253288 A1    Oct. 16, 2008

(30) Foreign Application Priority Data

Apr. 12, 2007 (JP) ................................. 2007-104981

(51) Int. Cl.
 *H04L 12/56* (2006.01)
(52) U.S. Cl. ........................................................ 370/235
(58) Field of Classification Search ............... 370/395.41–395.42, 230.1, 235.1, 370/468
See application file for complete search history.

(56) References Cited

U.S. PATENT DOCUMENTS

| | | | | |
|---|---|---|---|---|
| 5,684,798 A * | 11/1997 | Gauthier | .................. | 370/395.42 |
| 5,781,531 A * | 7/1998 | Charny | ........................ | 370/232 |
| 6,154,459 A * | 11/2000 | Wicklund | .................. | 370/230.1 |
| 6,198,723 B1* | 3/2001 | Parruck et al. | ............. | 370/230.1 |
| 6,477,144 B1* | 11/2002 | Morris et al. | ............. | 370/230.1 |
| 6,512,741 B1* | 1/2003 | Kohzuki et al. | ........... | 370/230.1 |
| 6,810,012 B1* | 10/2004 | Yin et al. | .................. | 370/230.1 |
| 6,920,109 B2* | 7/2005 | Yazaki et al. | ............. | 370/230.1 |
| 7,023,799 B2* | 4/2006 | Takase et al. | ............. | 370/230.1 |
| 7,027,393 B1* | 4/2006 | Cheriton | .................. | 370/230.1 |
| 7,474,668 B2* | 1/2009 | Bauman et al. | ............. | 370/412 |
| 7,489,632 B2* | 2/2009 | Lakkakorpi | .................. | 370/231 |
| 2004/0151184 A1* | 8/2004 | Wang et al. | ................ | 370/395.2 |
| 2007/0258370 A1* | 11/2007 | Kondapalli | .................. | 370/234 |

FOREIGN PATENT DOCUMENTS

JP     2000-031974     1/2000

OTHER PUBLICATIONS

"Traffic Management Specification", version 4.0, The ATM Forum, Technical Committee, Apr. 1996.

* cited by examiner

*Primary Examiner* — Ricky Ngo
*Assistant Examiner* — Ben Liu
(74) *Attorney, Agent, or Firm* — Mattingly & Malur, PC

(57) ABSTRACT

In order to allow priority transfer (fluctuation) over VLL packets while keeping each contracted bandwidth constantly, a leaky bucket model is expanded to have a threshold 1509 for permitting transmission of a packet (e.g. a WFQ packet) other than an LLQ packet and a threshold 1501 (larger than the threshold 1509) for permitting transmission of the LLQ packet (two-threshold leaky bucket model). In this manner, even when a WFQ cannot be transmitted, an LLQ can be transmitted with priority. In addition, while the total bandwidth of the WFQ and LLQ, i.e. the bandwidth of the VLL contains fluctuation, the contracted bandwidth can be complied with. The circuit of the model is provided in LLQ and WFQ transmission appointed time calculating circuits so as to calculate respective transmission appointed times so that an LLQ/WFQ is selected and a packet is selected based on the times considering priority.

8 Claims, 14 Drawing Sheets

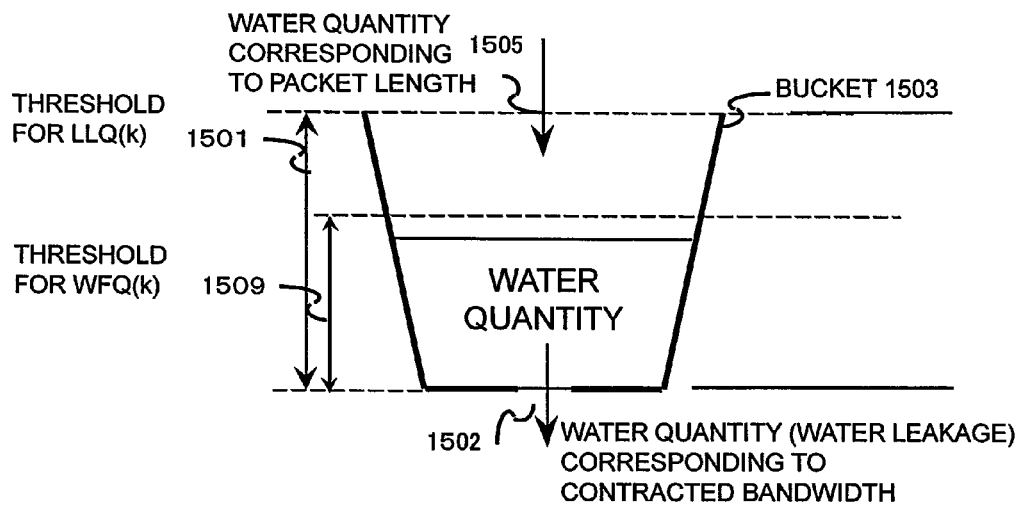

Fig.7A

| | LLQ TRANSMISSION APPOINTED TIME CALCULATING CIRCUIT 130 | WFQ TRANSMISSION APPOINTED TIME CALCULATING CIRCUIT 140 |
|---|---|---|
| THRESHOLD FOR WFQ(k) | — | •WHEN A WATER LEVEL DOES NOT EXCEED THE THRESHOLD 1509 FOR WFQ(k), SET A TRANSMISSION TIME TO BE THE PRESENT TIME AND WRITE THE TRANSMISSION TIME INTO THE WFQ SORTING INFORMATION MEMORY 147.<br>• WHEN A WATER LEVEL EXCEEDS THE THRESHOLD 1509, CALCULATE A TRANSMISSION TIME TO BE A TIME THAT THE WATER LEVEL IS NOT HIGHER THAN THE THRESHOLD 1509, AND WRITE THE TRANSMISSION TIME INTO THE WFQ SORTING INFORMATION MEMORY 147 |
| THRESHOLD FOR LLQ(k) | •WHEN A WATER LEVEL DOES NOT EXCEED THE THRESHOLD 1501 FOR LLQ(k), SET A TRANSMISSION TIME TO BE THE PRESENT TIME AND WRITE THE TRANSMISSION TIME INTO THE LLQ SORTING INFORMATION MEMORY 137.<br>• WHEN A WATER LEVEL EXCEEDS THE THRESHOLD 1501, CALCULATE A TRANSMISSION TIME TO BE A TIME THAT THE WATER LEVEL IS NOT HIGHER THAN THE THRESHOLD 1501, AND WRITE THE TRANSMISSION TIME INTO THE LLQ SORTING INFORMATION MEMORY 137 | — |

Fig.7B

TRAFFIC SHAPING CIRCUIT, TERMINAL DEVICE AND NETWORK NODE

BACKGROUND OF THE INVENTION

The present invention relates to a traffic shaping circuit, a terminal device and a network node. It particularly relates to a traffic shaping circuit in a fixed- or variable-length packet transmission terminal or a network node (such as a router), the transmission terminal and the network node.

There is increasing importance of a quality of service function (hereinafter referred to as QoS function) in packet communication implemented using an asynchronous transfer mode (ATM) switch, a router, etc. As typical examples of the QoS function, there are priority control (low latency period transfer), discard control (low discard rate transfer), bandwidth control (maximum or minimum bandwidth ensuring transfer), etc. Among these, the bandwidth control is a function for dividing a physical line bandwidth into logical bandwidths and transmitting/receiving packets in the divided logical bandwidths. For example, the bandwidth control is the QoS required for bandwidth provision service for providing a constant bandwidth based on a contract between each user and a network. For example, the bandwidth control is effective in the case where completion of the service needs to be guaranteed within a target time at the time of distribution of contents or backup of a storage device.

In a packet transmitting line of an ATM switch, a router etc., a chunk of information (hereinafter referred to as packets) called cells or packets are outputted to a port in accordance with predetermined rules (shaping model) provided in a shaping circuit so that the aforementioned QoS is implemented. The shaping circuit classifies a variety of packets to be outputted to one and the same port in the device in accordance with kinds of flow, accumulates the variety of packets in queuing buffers once, and outputs the variety of packets from the queuing buffers in accordance with priorities and bandwidth target values. As examples of the shaping model, there are a priority control model, a bandwidth control model, and a multistage hierarchical shaping model.

First, the priority control model is a model in which packets of a high priority queue among queues to be outputted to one and the same line are outputted with priority over packets of the other queues so that the staying time of the packets of the high priority queue in the device is shortened and low latency transfer is therefore implemented. Maintaining service of quality of high-priority packets by this priority control model is suitable, for example, for low latency transfer of VOICE, video etc. and low discard rate transfer of mission critical data. It was however difficult to offer fair bandwidth service based on contracted bandwidths among contract parties (users) (Background Art 1).

Next, the bandwidth control model is a model carried out as follows by way of example. That is, logical bandwidth values are set respectively for packet queues to be outputted to one and the same line so that packets are outputted from the queues which are changed from one to another based on the bandwidth values. In this manner, transfer is implemented while the logical bandwidth values of the respective queues are complied with. A next packet transmission appointed time is calculated, for example, by a leaky bucket model. The leaky bucket model has been described, for example, in "The ATM Forum TM4.0 Normative Annex C: Traffic Contract Related Algorithms and Procedures, P. 62, 63" (Non-Patent Document 1). Although it is possible to use the bandwidth control model to offer bandwidth provision service, i.e. SLA (Service Level Agreement) management service for sharing one and the same line bandwidth among contract parties (users) each consequently using a contracted bandwidth (logical bandwidth), it was difficult to selectively provide priority control over packets which needs to be transferred with low latency in the contracted bandwidth (Background Art 2).

The hierarchical shaping model can be also regarded as a model of combining rules of the aforementioned Background Art 1, Background Art 2, etc. For example, Background Art 3 has been described in Patent Document 1. In Embodiment 4 of Patent Document 1, for example, contracted bandwidths of users with a network are allocated respectively to the users for variable-length packets to be outputted from the users to one and the same port. In a priority control circuit 15210, packets from one and the same user are classified into queues corresponding to transfer priorities judged based on information of transfer destinations, priorities, etc. so that priority control over the queues in the allocated contracted bandwidth is performed. In this manner, while one and the same line is divided into contracted bandwidths used by users, priority control service in the contracted bandwidths can be offered simultaneously. Low latency period transfer is offered by transferring low latency packets of a user with priority over the other priority packets in the contracted bandwidth of one and the same line. It is possible to provide a traffic shaping device for a packet transmission terminal or a packet switch, which can effectively use the line bandwidth and the contracted bandwidth of each user.

[Patent Document 1] Japanese Patent Laid-Open No. 2000-31974

[Non-Patent Document 1] "The ATM Forum TM4.0 Normative Annex C: Traffic Contract Related Algorithms and Procedures", P. 62, 63,

SUMMARY OF THE INVENTION

As described above, the bandwidth control circuit can transmit specific packets with priority, suppress a transmission bandwidth to logical bandwidth values, or perform hierarchical shaping by combination of the preceding two methods.

The hierarchical shaping model (Background Art 3) has a contract sorting portion and a priority sorting portion so that the hierarchical shaping model can perform priority control by classifying packets from a user into queues in accordance with priorities in a contracted bandwidth, while complying with the contracted bandwidth of the same user with the network. In this manner, low latency transfer of low latency packets can be implemented.

Description about problems that the invention is to solve will be made with reference to FIG. 12 etc.

FIG. 12 shows a network for providing communication service to transmission terminals (user terminals) having traffic shaping circuits. When one of users uses a carrier Ethernet network (e.g. broadband Ethernet network) as a packet communication network, accounting is made in accordance with a contracted bandwidth of a bandwidth shared by the users with the network. The case where a contract in this bandwidth unit is made in accordance with each destination point will be described here as an example of the simplest service. FIG. 12 shows the state that terminals 300, 1901, 1902, and 1903 are connected to a carrier Ethernet network 340. When, for example, the terminal 300 transmits packets beyond the contracted bandwidth to the terminal 1901, the packets are discarded in an output port of the carrier Ethernet network 340 toward the terminal 1901. Accordingly, the terminal 300 transmits packets within the contracted bandwidths to the terminals 1901, 1902 and 1903 when the terminal 300 performs communication with the terminals 1901, 1902 and 1903.

In this manner, the user side complies with the bandwidth so as not to exceed the contracted bandwidth. The network side offers communication service while keeping communication quality (contracted bandwidth). Here, this communication service is called virtual leased line (hereinafter abbreviated to VLL) service. This is to use a communication network used by users, such as an ATM network, an IP network etc., so as to offer high-quality (bandwidth-guaranteed) high-reliability service actually having the same level as a leased line. Since the line is not always secured, this service can be offered at a considerably cheaper cost than the service by a leased line according to the background art. The user side sets classes for priority transfer and bandwidth allocation transfer so that transmission is performed in accordance with characteristics of various applications while the bandwidth in the VLL is effectively utilized. The VLL is a concept of a virtual bandwidth connection in a packet switching network using bandwidth control. The packet communication network in FIG. 12 does not depend on a specific protocol but may be applied to Ethernet packet, IP packet, MPLS packet and ATM cell. The case where the communication network is applied to Ethernet packet will be described here.

For example, FIG. 12 is shown on the assumption that the line between the terminals 300 and 1901 is secured as a VLL (0) 210 with a bandwidth of 60 Mbps, the line between the terminals 300 and 1902 is secured as a VLL (1) 220 with a bandwidth of 20 Mbps and the line between the terminals 300 and 1903 is secured as a VLL (2) 230 with a bandwidth of 20 Mbps. The VLL (0) to VLL (2) are bundled into a 100 Mbps line connecting between the terminal 300 and an Ethernet switch 350, to thereby perform transmission. Conversely, the terminals 1901, 1902 and 1903 also transmit packets to the terminal 300 in the bandwidths of the VLL (0) to VLL (2). Incidentally, the bandwidth value of VLL (i) in the transmission direction may be different from that in the reception direction.

FIG. 3 shows an example of the hierarchical shaping model.

FIG. 3 is a conceptual view showing the relation between a line 200 and Virtual Leased Lines (VLLs) through which packets are transmitted in accordance with contracted bandwidths, and the relation between a Low Latency Queuing (LLQ) and a Weighted Fair Queuing (WFQ) which are two priority classes in each VLL. The LLQ is a queue filled with packets (such as VOICE packets) high in latency priority. The WFQ is a queue filled with data packets low in transmission priority. In FIG. 3, two queues, i.e. an LLQ 211 and a WFQ 212 are bundled in a VLL (0) 210 of 60 Mbps. In the same manner, an LLQ 221 and a WFQ 222 are bundled in a VLL (1) 220 of 20 Mbps, and an LLQ 231 and a WFQ 232 are bundled in a VLL (2) 230 of 20 Mbps.

In this manner, priority transfer control in each contracted bandwidth (VLL) can be achieved. Since the bandwidth in each class is controlled while priority is given to comply with the contracted bandwidth of each user, it is difficult to shorten a latency period depending on the transfer time of each contracted bandwidth (each VLL). When, for example, there are transmission packets in a queue of a specific user, low latency packets for the specific user may need to wait for transmission timing unless the bandwidths allocated to the other users are consumed. Thus, a latency period depending on the allocated bandwidth may increase. In the case where, for example, there is a request for transmitting low latency transfer class packets at the time when the VLL (0) has consumed the allocated bandwidth, the low latency transfer class packets can just wait because the bandwidth needs to be complied with even if there are low priority WFQ packets in the queues of the other users (VLL (1, 2)).

That is, there has been a problem that as the number of users transferring packets in one and the same line increases, a latency period depending on the allocated bandwidth becomes long (Problem 1 of the invention).

This problem will be described with reference to a time chart of FIG. 8A.

The time chart of FIG. 8A shows an example of the relation between bandwidth allocation for each VLL and transmission time of an VOICE packet and a data packet in the VLL. In the case where, for example, a high latency priority packet (such as VOICE packet (0)) of a VLL (0) is in a waiting status to be transmitted from an LLQ of the VLL (0) at a point of time when the transmission time of the VLL (0) has passed, the VOICE packet (0) needs to wait for transmission for a period of transmission times of the other VLLs until the next transmission time of the VLL (0) comes. This even applies to the case where data packets low in transmission priority are accumulated and are being transmitted in the WFQs of the other VLLs. Background Art 3 had a problem that unless the allocated bandwidths of the other users have been consumed so that the transmission timing of the VLL (0) comes, the low latency packets of the VLL (0) of the user can just wait for the transmission timing (Problem 1 of the invention).

In the case where packets of the other users (VLL (k), k is other than 0) than the VLL (0) are best-effort data packets, there is no request for a low latency period transfer class of the VLL (k) so that a low latency packet in the LLQ of the VLL (0) of the user is transferred prior to the data packets. Even if this arrangement has been done, there is no influence on the best-effort communication quality. When the low latency packet (such as VOICE packets (0)) of the VLL (0) of the user can be transferred with priority as shown in FIG. 8B, increase of the latency period can be suppressed. On the other hand, there was however a problem as follows. That is, when the LLQ packet is further transferred with priority regardless of the fact that the VLL (0) of the specific user has already consumed the allocated bandwidth, the bandwidth beyond the contracted bandwidth condition has been consumed so that the contracted bandwidth cannot be complied with. In addition, there was another problem that the next transmission bandwidth of the VLL(0) needs to be reduced by the LLQ packet for interpolation (Problem 2 of the invention).

To summarize the abovementioned problems, there is a demand for a traffic shaping device in each of a packet transmission terminal and a packet switch, which complies with a contracted bandwidth, and at the same time, which minimizes a latency period for a low latency transfer class in the case where priority is given to comply with the contracted bandwidth.

In consideration of the abovementioned circumstances, an object of the present invention is to provide a traffic shaping circuit, a transmission terminal and a network node for transferring a low latency packet of a specific user with priority so as to suppress increase of a latency period while complying with contracted bandwidths of bandwidth contract parties (such as users) respectively in the case where the users share a bandwidth of one and the same medium (which can be a shared wireless bandwidth such as an Ethernet line or a wireless LAN) for transferring packets.

In order to permit priority transfer (fluctuation) over VLL packets while complying with each contracted bandwidth constantly, the aforementioned leaky bucket model is expanded to have a threshold 1509 for permitting transmission of a packet (such as WFQ packet) other than an LLQ packet and a threshold 1501 (set to be larger than the threshold 1509) for permitting transmission of the LLQ packet (two-threshold leaky bucket model: FIGS. 7A and 7B). In this manner, even when a WFQ cannot be transmitted, an LLQ can be transmitted with priority. In addition, the contracted bandwidth can be complied with while the total bandwidth of the WFQ and LLQ, i.e. the bandwidth of the VLL contains the fluctuation (Means 1).

This two-threshold leaky bucket model circuit is provided in an LLQ transmission appointed time calculating circuit 130 and a WFQ transmission appointed time calculating circuit 140 for calculating transmission appointed times respectively (Means 2 and Means 3).

There are provided an LLQ sorting portion (Means 4) which detects an LLQ to be transmitted from all the LLQs, and a WFQ sorting portion (Means 5) which detects a WFQ to be transmitted from all the WFQs. There is provided a transmission control portion 120 (Means 6) which decides sorting results of the LLQ sorting portion and the WFQ sorting portion while taking priorities into consideration.

For example, the traffic shaping circuit according to the invention is a hierarchical traffic shaping device which provides priority classes in the contracted bandwidth by a traffic shaping function in a line for transmitting packets or cells so as to have a priority control function among the classes, wherein the hierarchical traffic shaping device has a leaky bucket model transmission timing deciding circuit provided with two or more thresholds corresponding to priorities.

The aforementioned traffic shaping circuit has transmission appointed time deciding circuits corresponding to priorities, and leaky bucket model transmission timing deciding circuits containing thresholds corresponding to the priorities are provided in the transmission appointed time deciding circuits.

The aforementioned traffic shaping circuit has transmission packet sorting circuits in accordance with the priorities, and a transmission control portion which receives outputs of the transmission packet sorting circuits so as to decide a transmission packet in accordance with the priorities.

The aforementioned traffic shaping circuit reflects correction of a water level of a corresponding leaky bucket after transmission of the packet onto the leaky bucket model transmission timing deciding circuits containing the thresholds corresponding to the respective priorities in the transmission appointed time deciding circuits corresponding to the priorities.

According to the first solving means of this invention, there is provided a traffic shaping circuit for transmitting packets in accordance with a predetermined transmission bandwidth and priority class in a network over which first priority class packets and second priority class packets are communicated through a virtual connection having the transmission bandwidth, comprising:

a packet buffer portion which has a first queue for storing received first priority class packets, and a second queue for storing received second priority class packets;

a first transmission appointed time calculating portion which calculates a first transmission appointed time of the first queue;

a second transmission appointed time calculating portion which calculates a second transmission appointed time of the second queue;

a memory which stores the calculated first transmission appointed time, the calculated second transmission appointed time and a water level of a bucket which increases by a water quantity corresponding to packet lengths of packets outputted from the first and second queues and decreases by a water quantity corresponding to the transmission bandwidth of the virtual connection; and a transmission control portion which judges whether or not the first queue and the second queue can be transmitted at the present time respectively based on the first transmission appointed time of the first queue and the second transmission appointed time of the second queue, selects the first queue with priority when the first queue can be transmitted, selects the second queue when the second queue can be transmitted and the first queue cannot be transmitted, and notifies the packet buffer of a first queue identifier of the selected first queue or of a second queue identifier of the selected second queue, so that a packet is read and outputted from the first queue corresponding to the first queue identifier of the packet buffer or a packet is read and outputted from the second queue corresponding to the second queue identifier of the packet buffer;

wherein:

when the first queue is selected by the transmission control portion, the first transmission appointed time calculating portion calculates a next first transmission appointed time of the first queue based on the water level of the bucket in the memory and a predetermined first threshold for the first priority class, and stores the calculated next first transmission appointed time in the memory;

when the second queue is selected by the transmission control portion, the second transmission appointed time calculating portion calculates a next second transmission appointed time of the second queue based on the water level of the bucket in the memory and a second threshold for the second priority class smaller than the first threshold, and stores the calculated next second transmission appointed time in the memory; and the first or second transmission appointed time calculating portion updates the water level of the bucket in the memory based on a packet length of the packet transmitted from the first or second queue and the transmission bandwidth of the virtual connection.

According to the second solving means of this invention, there is provided a traffic shaping circuit for transmitting packets in accordance with a predetermined transmission bandwidth and priority class in a network over which a plurality of virtual connections each having the transmission bandwidth are bundled into one line and first priority class packets and second priority class packets are communicated through the virtual connections, comprising:

a packet buffer portion which has a plurality of first queues in accordance with the virtual connections for storing received first priority class packets, and a plurality of second queues in accordance with the virtual connections for storing received second priority class packets;

a first transmission appointed time calculating portion which calculates a first transmission appointed time of each first queue;

a second transmission appointed time calculating portion which calculates a second transmission appointed time of each second queue;

a first sorting portion in which the calculated first transmission appointed times are stored correspondingly to first queue identifiers for identifying the first queues and which selects one first queue from which a packet will be transmitted with priority, based on the stored first transmission appointed times and whether there is a packet in each of the first queues;

a second sorting portion in which the calculated second transmission appointed times are stored correspondingly to second queue identifiers for identifying the second queues and which selects one second queue from which a packet will be transmitted with priority, based on the stored second transmission appointed times and whether there is a packet in each of the second queues; and a transmission control portion which judges whether the selected first queue and the selected second queue can be transmitted at the present time respectively based on the first transmission appointed time of the selected first queue and the second transmission appointed time of the selected second queue, selects the selected first queue with priority when the first queue can be transmitted, selects the selected second queue when the second queue can be transmitted and the selected first queue cannot be transmitted, and notifies the packet buffer of the first queue identifier of the first queue or of the second queue identifier of the second queue, so that a packet is read and outputted from the first queue corresponding to the first queue identifier of the packet buffer or a packet is read and outputted from the second queue corresponding to the second queue identifier of the packet buffer;

wherein:

when the first queue is selected by the transmission control portion, the first transmission appointed time calculating portion calculates a next first transmission appointed time of the first queue based on a water level of a bucket of the virtual connection corresponding to the selected first queue and a predetermined first threshold for a first priority class, the water level of the bucket increasing by a water quantity in accordance with packet lengths of packets outputted from the first and second queues corresponding to the virtual connection and decreasing by a water quantity corresponding to the transmission bandwidth of the virtual connection, and the first transmission appointed time calculating portion stores the calculated next first transmission appointed time in the first sorting portion correspondingly to the first queue identifier; and when the second queue is selected by the transmission control portion, the second transmission appointed time calculating portion calculates a next second transmission appointed time of the second queue based on a water level of the bucket of the virtual connection corresponding to the selected second queue and a second threshold for a second priority class smaller than the first threshold, and the second transmission appointed time calculating portion stores the calculated next second transmission appointed time in the second sorting portion correspondingly to the second queue identifier.

According to the third solving means of this invention, there is provided a terminal device for transmitting packets in accordance with a predetermined transmission bandwidth and priority class in a network over which a plurality of virtual connections each having the transmission bandwidth are bundled into one line and first priority class packets and second priority class packets are communicated through the virtual connections, comprising:

a line interface portion having a traffic shaping circuit described above; and a processing portion;

wherein:

the traffic shaping circuit transmits a packet from the processing portion to the network in accordance with transmission bandwidth and priority class.

According to the fourth solving means of this invention, there is provided a network node comprising:

a first line interface portion for a terminal device;

a second line interface portion for a network; and a switch portion which is connected to the first line interface portion and the second line interface portion respectively;

wherein:

the second line interface portion has a traffic shaping circuit described above; and the traffic shaping circuit transmits a packet from the switch portion to the network in accordance with transmission bandwidth and priority class.

According to the fifth solving means of this invention, there is provided a network node comprising:

a first line interface portion for a terminal device;

a second line interface portion for a network;

a traffic shaping circuit described above; and a switch portion which is connected to the first line interface portion, the second line interface portion and the traffic shaping circuit respectively;

wherein:

the switch portion transfers a packet from the first line interface portion to the traffic shaping circuit and transfers a packet outputted by the traffic shaping circuit in accordance with transmission bandwidth and priority class to the network through the second line interface portion.

According to the invention, it is possible to provide a traffic shaping circuit for transferring a low latency packet of a specific user with priority so as to suppress increase of a latency period while complying with contracted bandwidths of bandwidth contract parties (such as users) respectively in the case where the users share a bandwidth of one and the same medium (which can be a shared wireless bandwidth such as an Ethernet line or a wireless LAN) for transferring packets.

BRIEF DESCRIPTION OF THE DRAWINGS

FIGS. 7A and 7B are image views of judgment algorithms inside an LLQ (k) transmission appointed time calculating circuit 130 and a WFQ (m) transmission appointed time calculating circuit 140 of the traffic shaping circuit according to the invention (having a threshold for WFQ and a threshold for LLQ);

DETAILED DESCRIPTION OF THE INVENTION

Figure 2:
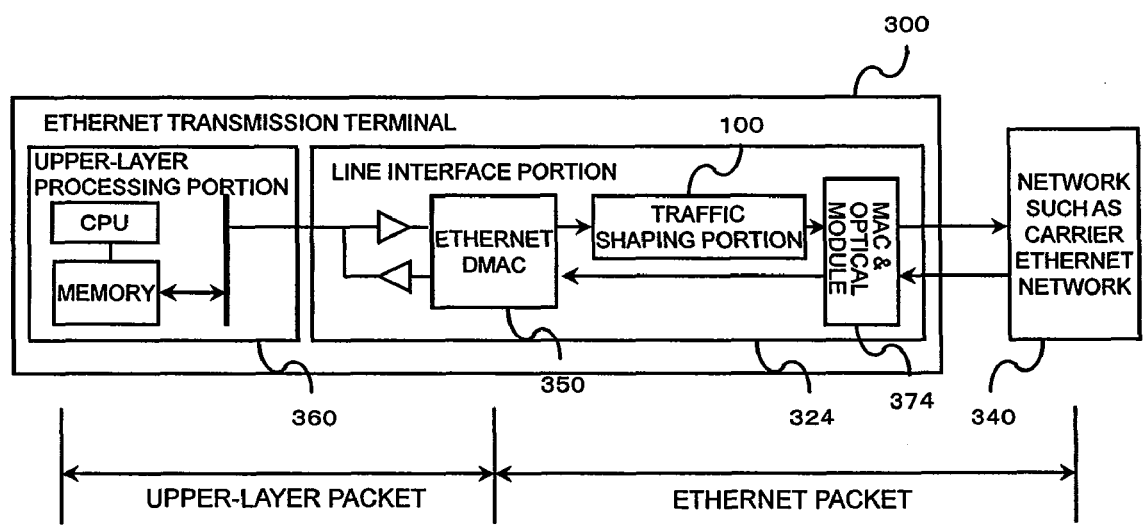
FIG. 2 is a configuration diagram in the case where the traffic shaping circuit according to the invention is mounted in a terminal device.
Figure 3:
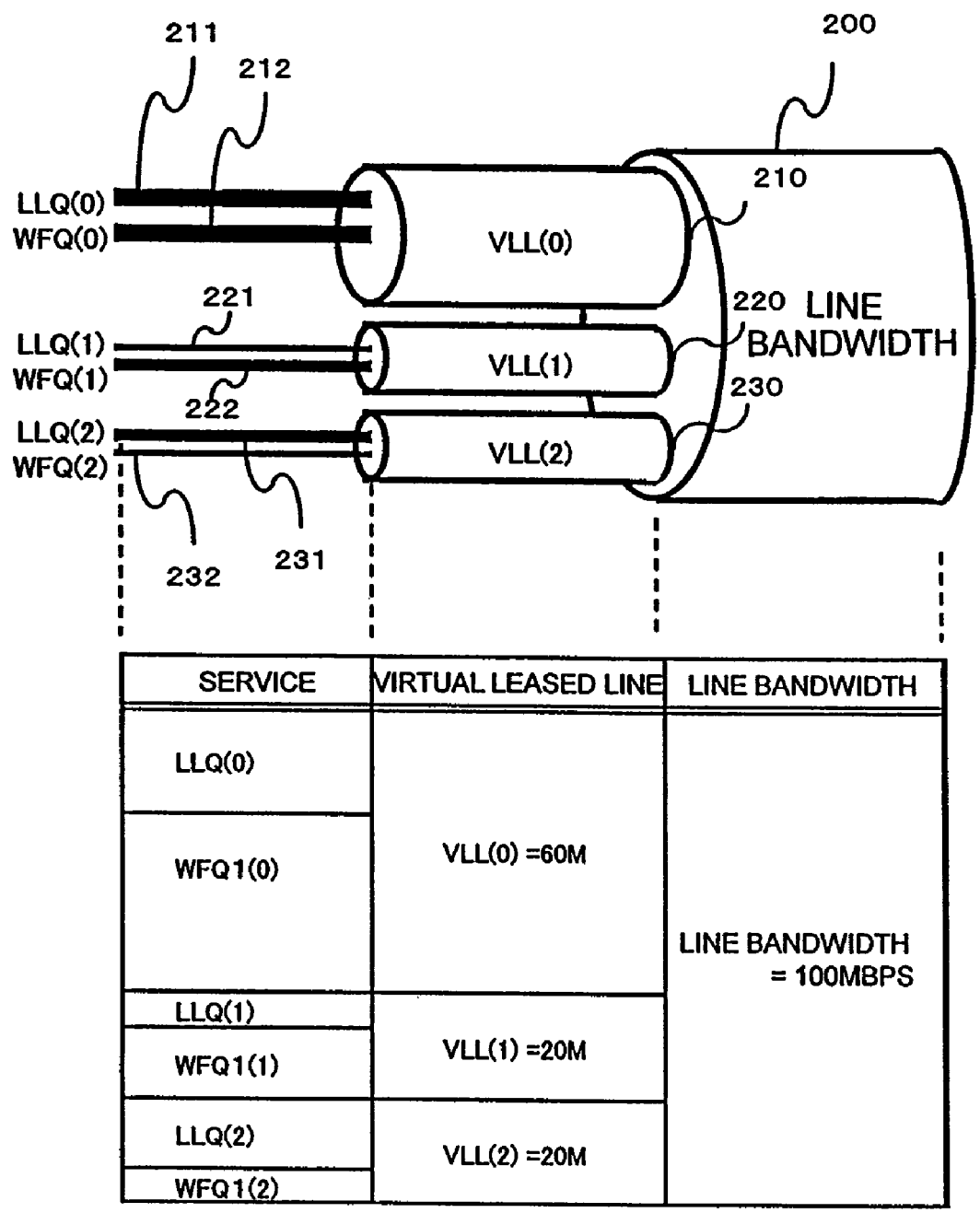
FIG. 3 is an image view showing configuration of bandwidths to be shaped by the traffic shaping circuit according to the invention.

FIG. 2 is a configuration diagram of an Ethernet transmission terminal.

An example in which a traffic shaping device is applied to the terminal 300 shown in FIG. 2 will be described in detail hereinafter as a mode for carrying out the invention. The Ethernet transmission terminal implements VLL shaping and priority control synchronously in the traffic shaping device. There is assumed the case where, for example, two classes, i.e. an LLQ (k) (first priority class, first queue) and a WFQ (k) (second priority class, second queue) are provided in a VLL (k) (virtual connection) so that priority control between the classes is performed (Embodiment 1).

As described above, the VLL, LLQ and WFQ are concepts of virtual logical bandwidths in a packet switching network using bandwidth control, and do not depend on any specific protocol. Accordingly, the mode for carrying out the invention can be also applied to Ethernet packet, IP packet, MPLS (Multi-Protocol Label Switching) packet, and ATM cell. MPLS shim label, IP packet header, and VLAN-tag (Virtual LAN Tag) can be also applied as VLL identifiers. The case where the mode for carrying out the invention is applied to Ethernet packet will be described here. Description will be made here on the assumption that a VLAN-tag is used as a VLL identifier and a user priority bit in the VLAN-tag is used as an identifier of the priority transfer class LLQ/WFQ by way of example.

FIG. 2 is a configuration diagram of the Ethernet transmission terminal 300.

For example, the Ethernet transmission terminal 300 has an upper-layer processing portion 360, and a line interface portion 324 to a carrier Ethernet network 340. The upper-layer processing portion 360 has a CPU, and a memory. In the upper-layer processing portion 360, a higher-order protocol (such as IP (Internet Protocol)) for transferring information using the Ethernet network is activated to generate and terminate a higher-order packet which can be recognized by the higher-order IP.

The line interface portion 324 further has an Ethernet DMAC (Dynamic Memory Access Control) 350, a traffic shaping portion 100, and an MAC & optical module 374. The Ethernet DMAC 350 transmits/receives the higher-order packet generated by the upper-layer processing portion 360 and an Ethernet packet (having a variable length in the range of from 64 bits to 1500 bits). The traffic shaping portion 100 transmits packets at transmission intervals while complying with a contracted bandwidth with the carrier Ethernet network 340. The MAC & optical module 374 converts the Ethernet packet into a signal corresponding to a physical line such as an optical fiber, and transmits the converted signal.

Figure 1:
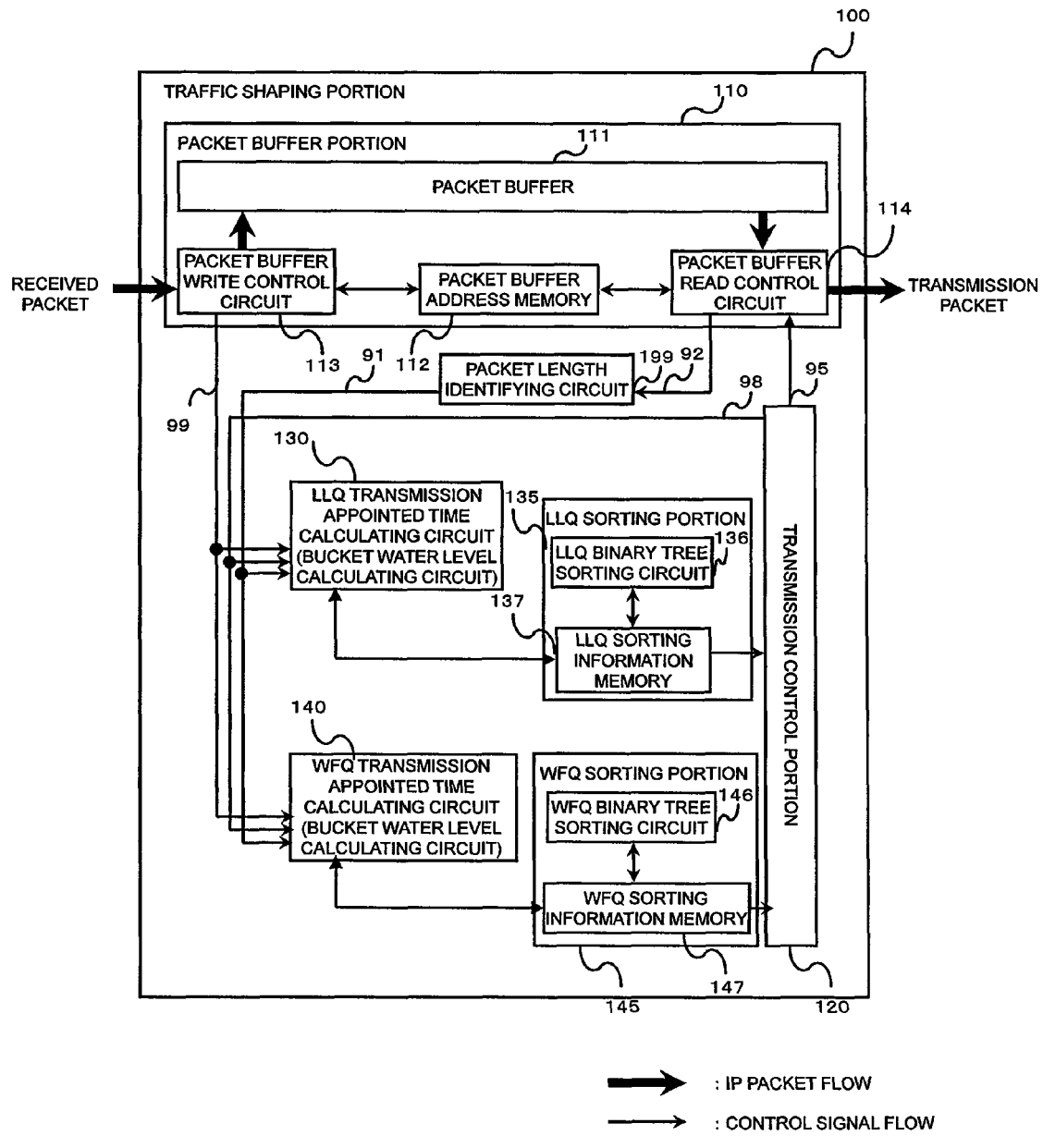
FIG. 1 is a diagram of the whole configuration of a traffic shaping circuit according to the invention.
Figure 4:
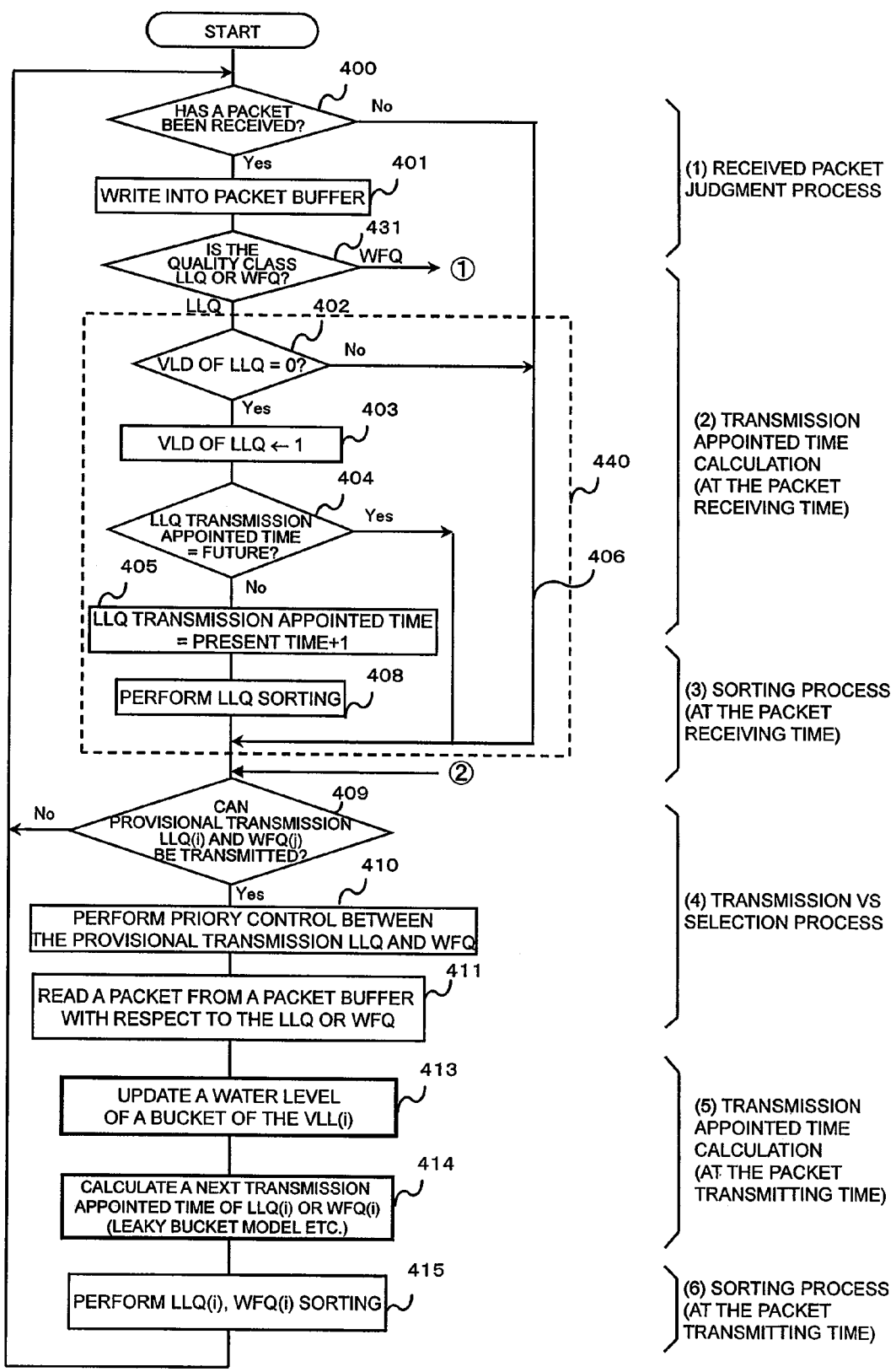
FIG. 4 is a flow chart of processes of the traffic shaping circuit according to the invention.

FIG. 1 is a block diagram showing the configuration of the traffic shaping portion 100. FIG. 4 is a flow chart showing the operation of the traffic shaping portion 100.

For example, the traffic shaping portion 100 has a packet buffer portion 110, an LLQ transmission appointed time calculating circuit (first transmission appointed time calculating portion) 130, an LLQ sorting portion (first sorting portion) 135, a WFQ transmission appointed time calculating circuit (second transmission appointed time calculating portion) 140, a WFQ sorting portion (second sorting portion) 145, and a transmission control portion 120.

The packet buffer portion 110 queues packets in line in accordance with the LLQs and WFQs. The transmission control portion 120 decides final packet transmission, and informs the packet buffer portion 110 of the decided packet transmission. The LLQ transmission appointed time calculating circuit 130 calculates transmission appointed times in accordance with the contracted bandwidths of the LLQs. Details of the transmission appointed times are shown in FIG. 7B and will be described later. The LLQ transmission appointed time calculating circuit 130 also calculates the water levels of buckets 1503 (which will be described later). The LLQ sorting portion 135 selects one LLQ from all the LLQs so that the selected LLQ will be transmitted with the highest priority.

The WFQ transmission appointed time calculating circuit 140 calculates transmission appointed times in accordance with the contracted bandwidths of the VLLs including the transmission bandwidths of the LLQs. Details of the transmission appointed times are shown in FIG. 7B and will be described later. The WFQ transmission appointed time calculating circuit 140 calculates the water levels of the buckets 1503 (which will be described later). The WFQ sorting portion 145 selects one WFQ from all the WFQs so that the selected WFQ will be transmitted with the highest priority.

Detailed constituent elements are further shown as follows.

First, the packet buffer portion 110 has a packet buffer 111, a packet buffer address memory 112, a packet buffer write control circuit 113, and a packet buffer read control circuit 114.

The packet buffer 111 is a buffer which temporarily accumulates packets. The packet buffer address memory 112 stores packet buffer addresses for performing queuing LLQs and WFQs in the packet buffer. The packet buffer address memory 112 also stores information about queue lengths in accordance with LLQs and WFQs. The packet buffer write control circuit 113 writes each received packet into the packet buffer. The packet buffer read control circuit 114 reads each packet to be transmitted from the packet buffer.

For example, the LLQ sorting portion 135 has an LLQ binary tree sorting circuit 136, and an LLQ sorting information memory 137.

Figure 5:
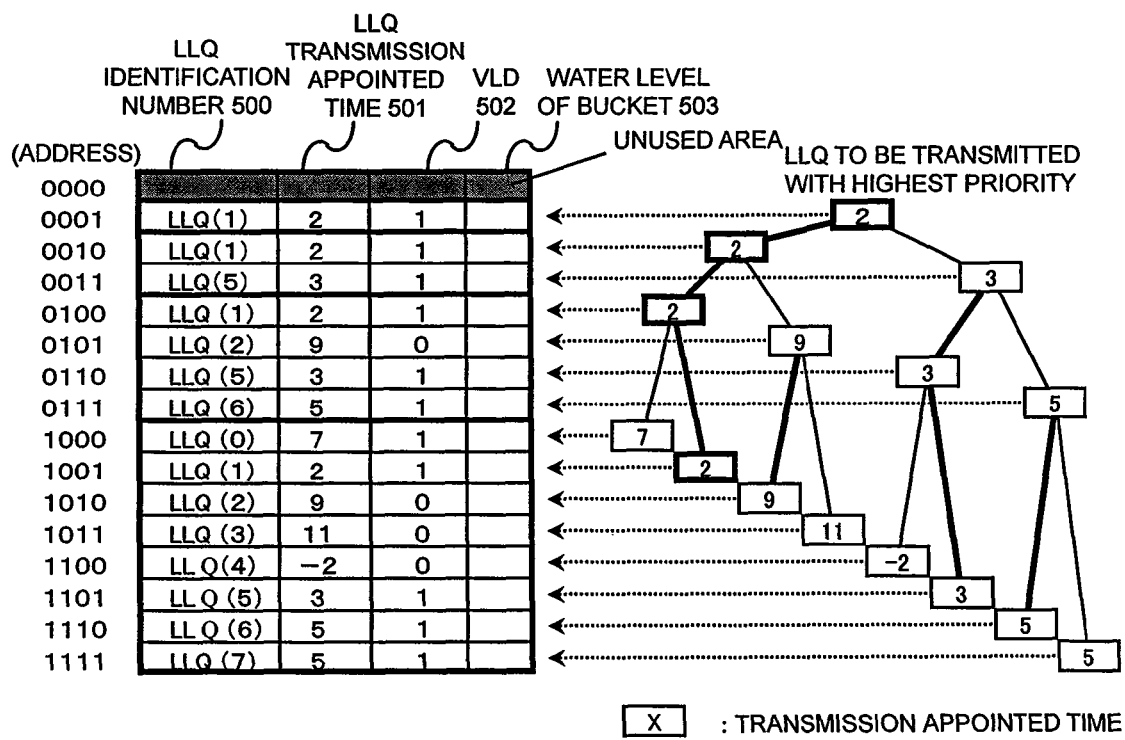
FIG. 5 is a view of the structure of an LLQ sorting information memory in the traffic shaping circuit according to the invention.

The LLQ binary tree sorting circuit 136 receives change of a transmission appointed time of an LLQ in which packet reception or transmission was performed, and selects one LLQ in which transmission will be carried out at a soonest time. The LLQ sorting information memory 137 stores the water levels of the buckets and information (LLQ identification numbers, LLQ transmission appointed times, and VLDs of LLQs (the three are collectively referred to as LLQ sorting information)) required when the LLQ binary tree sorting circuit 136 performs sorting. The VLD of each LLQ is a flag, for example, indicating whether there is a transmission-waiting packet in the LLQ or not. The VLL sorting information is managed by a binary tree. A memory map of the LLQ sorting information memory 137 is shown in FIG. 5 (details will be described later). The LLQ sorting information memory 137 receives and stores the water levels of the buckets and transmission appointed times updated in accordance with the change of the transmission appointed time of the LLQ where packet reception or transmission was performed, from the LLQ transmission appointed time calculating circuit 130.

For example, the WFQ sorting portion 145 has a WFQ binary tree sorting circuit 146, and a WFQ sorting information memory 147.

Figure 6:
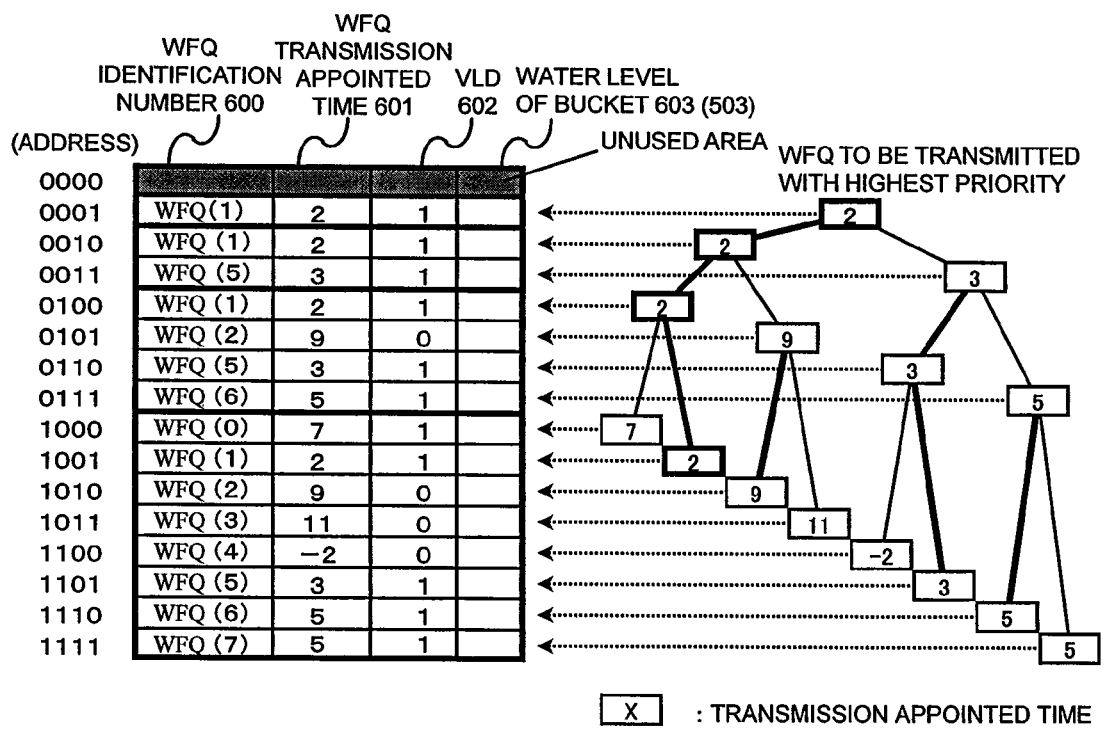
FIG. 6 is a view of the structure of a WFQ sorting information memory in the traffic shaping circuit according to the invention.
Figure 8A:
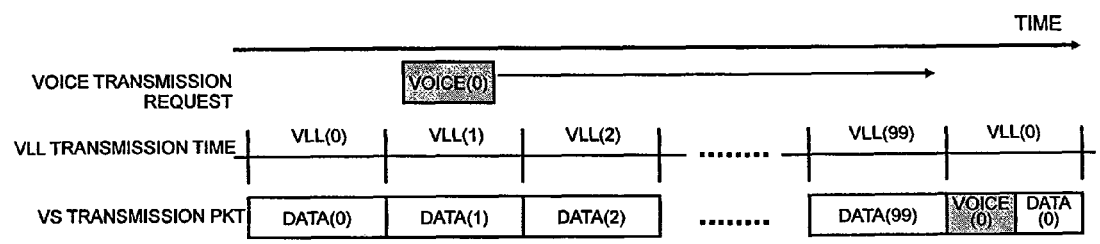
FIGS. 8A and 8B are time charts in the case where a latency period to be solved by the traffic shaping circuit according to the invention increases and the case where the latency period does not increase.
Figure 8B:
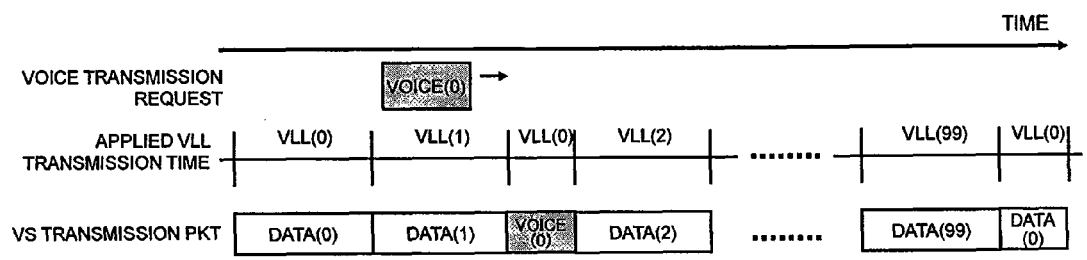

The WFQ binary tree sorting circuit 146 receives change of a transmission appointed time of a WFQ in which packet reception or transmission was performed, and selects one WFQ from all the WFQs so that the selected WFQ will be transmitted with the highest priority. The WFQ sorting information memory 147 stores the water levels of the buckets and information (WFQ identification numbers, WFQ transmission appointed times, and VLDs of WFQs (the three are collectively referred to as WFQ sorting information)) required when the WFQ binary tree sorting circuit 146 performs sorting. The VLD of each WFQ is a flag, for example, indicating whether there is a transmission-waiting packet in the WFQ or not. The WFQ sorting information is also managed by a binary tree. A memory map of the WFQ sorting information memory 147 is shown in FIG. 6 (details will be described later). The WFQ sorting information memory 147 receives and stores the water levels of the buckets and transmission appointed times updated in accordance with the change in the transmission appointed time of the WFQ where packet reception or transmission was performed, from the WFQ transmission appointed time calculating circuit 140.

The traffic shaping portion 100 according to the mode for carrying out the invention repeats the following six processes shown in FIG. 4 in a one-packet processing time to thereby receive one packet and transmit one packet within the one-packet processing time.

(1) Received Packet Judgment Process
(2) Transmission Appointed Time Calculation (at the Packet Receiving Time)
(3) Sorting Process (at the Packet Receiving Time)
(4) Transmission LLQ Selection Process
(5) Transmission Appointed Time Calculation (at the Packet Transmitting Time)
(6) Sorting Process (at the Packet Transmitting Time)

In the aforementioned six processes, processes (1) to (3) are processes performed at the packet receiving time and processes (4) to (6) are processes performed at the packet transmitting time. The respective processes will be described below in detail with reference to FIGS. 1 and 4. In order to identify VLLs, LLQs and WFQs individually, an identification number k is added so that notation is hereinafter indicated as VLL (k), LLQ (k) and WFQ (k).

(1) Received Packet Judgment Process

A packet which has arrived at the traffic shaping portion 100 is temporarily accumulated in one of queues (first and second queues) provided in accordance with the LLQs and the WFQs.

In the traffic shaping device according to the mode for carrying out the invention, for example, the packet buffer write control circuit 113 refers to a header of an Ethernet packet received from the Ethernet DMAC 350 so as to decide VLL information (transfer destination) and LLQ/WFQ information (priority) of the received packet. The packet buffer write control circuit 113 queues the received packet in one of the queues provided in accordance with the transfer destinations and priorities in the packet buffer 111. More specifically, the packet buffer write control circuit 113 first judges a VLL (LLQ or WFQ) to which the received packet belongs, based on a VLLI (Virtual Leased Line Identifier) described in the header portion of the received packet, specifically based on an LLQ Identifier (LLQI) or a WFQ identifier (WFQI) constituting the VLLI. When the received packet is for an LLQ, the packet buffer write control circuit 113 then reads a packet buffer address for performing queuing in accordance with each LLQ from the packet buffer address memory 112, and writes the packet in an area (queue) indicated by the packet buffer address in the packet buffer (400 and 401 in FIG. 4). Similarly, when the received packet is for a WFQ, the packet buffer write control circuit 113 writes the packet in accordance with an address for performing queuing in accordance with each WFQ. The aforementioned packet buffer address is stored in the packet buffer address memory 112.

Upon reception of the packet, the packet buffer write control circuit 113 notifies the LLQ transmission appointed time calculating circuit 130 and the WFQ transmission appointed time calculating circuit 140 of a packet reception signal 99 indicating that the packet has been received. While sending the packet reception signal 99, the packet buffer write control circuit 113 notifies the LLQ transmission appointed time calculating circuit 130 of an LLQ identification number (first queue identifier) in the case where the packet is for an LLQ, or notifies the WFQ transmission appointed time calculating circuit 140 of a WFQ identification number (second queue identifier) in the case where the packet is for a WFQ.

Figure 14:
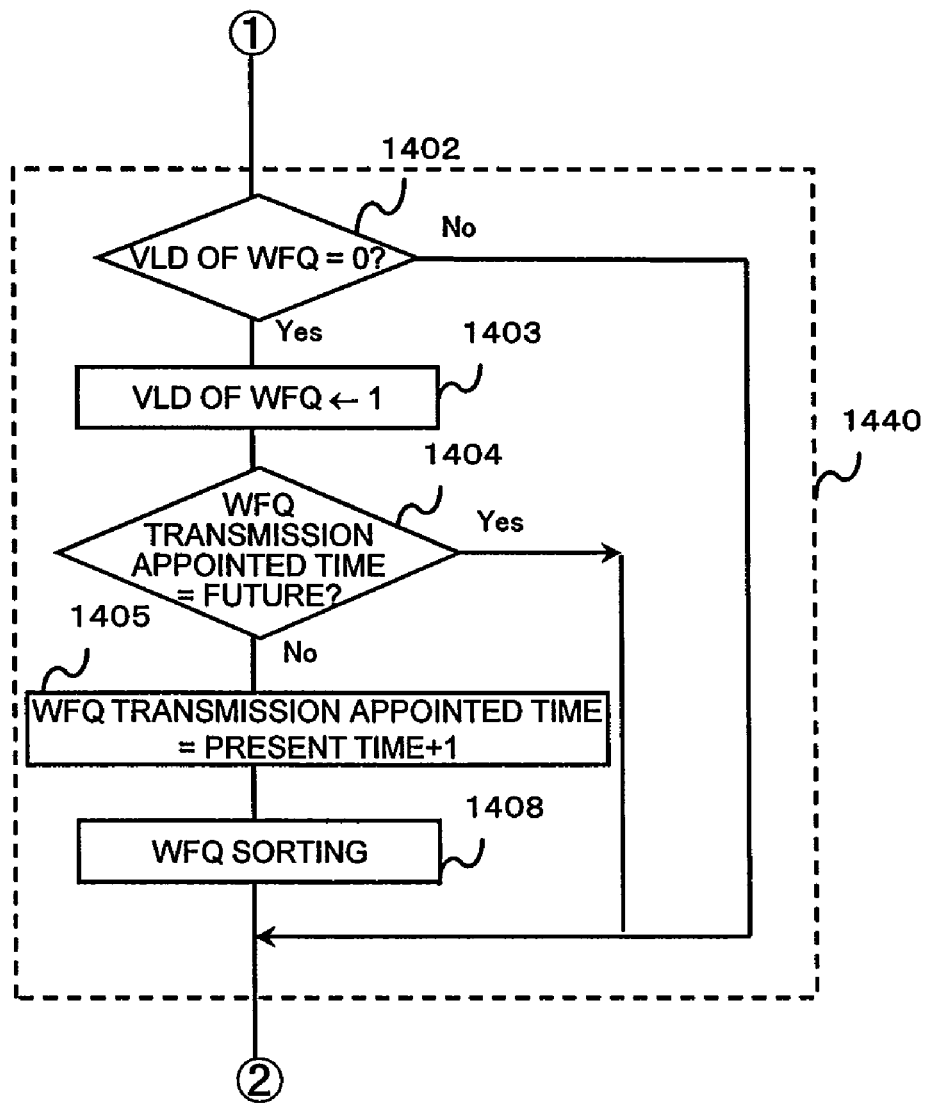
FIG. 14 is a flow chart in the case where the received packet is for a WFQ.

Then, judgment as to whether the quality class is LLQ or WFQ is made (431 in FIG. 4) so that the routine of processing advances to a process 402 of FIG. 4 or a process 1402 of FIG. 14 in accordance with a result of the judgment.

(2) Transmission Appointed Time Calculation (at the Packet Receiving Time)

First, description will be made in the case where the received packet is for an LLQ.

The LLQ transmission appointed time calculating circuit 130 which has received the packet reception signal 99 and the LLQ identification number reads a VLD (discrimination bit) of an LLQ (k) from the LLQ sorting information memory 137 based on the LLQ identification number k to thereby check whether the read VLD (502 in FIG. 5) of the LLQ (k) is "0" or "1" (402 in FIG. 4). In the case where the VLD is "1", it means that there has been already a transmission-waiting packet in the LLQ (k) so that the transmission appointed time is not allowed to be changed. On the other hand, in the case where the VLD is "0", the LLQ transmission appointed time calculating circuit 130 reads a calculated LLQ transmission appointed time 501 of the LLQ (k) from the LLQ sorting information memory 137 to thereby check whether the LLQ transmission appointed time 501 is the future or the past or the same as the present time which is set as the reference (404 in FIG. 4). In the former (future) case, the LLQ transmission appointed time 501 is not changed. In the later (past or present) case, for example, the LLQ transmission appointed time is set to be the present time+1 (405 in FIG. 4). The changed LLQ transmission appointed time is stored correspondingly to the identification number of the LLQ (k) in the LLQ sorting information memory 137. When the packet reception signal 99 has been received in any of the aforementioned cases, the VLD of the LLQ (k) is set to be "1" (403 in FIG. 4).

FIG. 14 is a flow chart in the case where the received packet is for a WFQ. Processes 1402 to 1408 in FIG. 14 are the same as the aforementioned processes 402 to 408 in FIG. 4 except that LLQ is changed to WFQ.

(3) Sorting Process (at the Packet Receiving Time)

LLQ sorting information of each LLQ is managed by a binary tree (with reference to FIG. 5). When the LLQ transmission appointed time of the LLQ (k) is updated, there is a possibility that an LLQ (hereinafter referred to as provisional transmission LLQ) in which a packet needs to be transmitted at a soonest time among all the LLQs may be changed, so that sorting for obtaining the provisional transmission LLQ is performed in the LLQ binary tree circuit 136 (408 in FIG. 4). The LLQ identification number 500, the LLQ transmission appointed time 501 and the VLD 502 (with reference to FIG. 5) of the LLQ to be transmitted with the highest priority among all the LLQs is stored in the root of the LLQ binary tree. Incidentally, the same rule applies to the case of WFQ.

Rules for the sorting process of the VLLs (LLQs or WFQs) according to the mode for carrying out the invention are as follows.

[1] When the VLDs of children are both "1", it is to select the child whose transmission appointed time is nearer to the past. When the times of the children are the same, any one of the children may be selected.

[2] When the VLD of one child is "1" while the VLD of the other child is "0", it is to unconditionally select the child with the VLD of "1".

[3] When the VLDs of the children are both "0", it is to select the child whose transmission appointed time is nearer to the past. When the times of the children are the same, any one of the children may be selected.

(4) Transmission LLQ Selection Process

When the LLQ transmission appointed time (or WFQ transmission appointed time) is the past or the same as the present time which is set as the reference, as a result of comparing the present time and the LLQ transmission appointed time with each other, the status of the LLQ is called a transmittable status. The same rule applies to the WFQ. The provisional transmission LLQ selected by the LLQ binary tree sorting circuit 136 is regarded as LLQ (i). Similarly, the provisional transmission WFQ is regarded as WFQ (j).

The transmission control portion 120 is monitoring in real time whether the LLQ (i) and the WFQ (j) are in a transmittable status or not (409 in FIG. 4). When neither LLQ (i) nor WFQ (j) are in a transmittable status, there is no packet transmitted. When one or each of the LLQ (i) and the WFQ (j) is in a transmittable status, the packet of the LLQ (i) or WFQ (j) is transmitted while priority is given to the LLQ (i) (410 in FIG. 4).

Specifically, a transmission permission signal 95, for example, together with the selected LLQ identification number i or WFQ identification number j, is sent to the packet buffer read control circuit 114 from the transmission control portion 120. The packet buffer read control circuit 114 which has received the transmission permission signal 95 reads a packet from the packet buffer 110 using a packet buffer address read from the packet buffer address memory 112 so that the packet is transmitted from the line interface portion 324 (411 in FIG. 4). The transmission control portion 120 transmits a packet transmission signal 98 to the LLQ transmission appointed time calculating circuit 130 and the WFQ transmission appointed time calculating circuit 140.

(5) Transmission Appointed Time Calculation (at the Packet Transmitting Time)

Processes 413 to 415 in FIG. 4 will be described below.

In the LLQ transmission appointed time calculating circuit 130 and the WFQ transmission appointed time calculating circuit 140 which have received the transmission permission signal 98, a water level of a bucket is updated so that a next packet transmission appointed time is calculated in accordance with a contracted bandwidth (413 and 414 in FIG. 4). For example, the LLQ transmission appointed time calculating circuit 130 receives the identification number i of the selected LLQ together with the packet transmission signal 98, so as to calculate a next packet transmission appointed time regarding the LLQ (i). Incidentally, the same rule also applies to the WFQ. For example, the next packet transmission appointed time can be calculated by the leaky bucket model. The leaky bucket model has been described, for example, in "The ATM Forum TM4.0 Normative Annex C: Traffic Contract Related Algorithms and Procedures, P. 62, 63" (Non-Patent Document 1). In another method for calculating a packet transmission appointed time, a transmission interval value (depending on packet length) corresponding to the contracted bandwidth is stored in advance so that the following calculation is performed.

In a transmission case based on Non-Patent Document 1, calculation is performed, for example, by the following formulate. Next Packet Transmission Appointed Time=Present Packet Transmission Appointed Time+Transmission Interval Value (The transmission interval value is set in accordance with Non-Patent Document 1.)

In the LLQ transmission appointed time calculating circuit 130 and the WFQ transmission appointed time calculating circuit 140 which have received the packet transmission signal 98, a next packet transmission appointed time is calculated in accordance with the contracted bandwidth, similarly to the case of an ATM cell of Non-Patent Document 1.

In the mode for carrying out the invention, there is provided a packet length identification circuit 199. When the packet buffer read control circuit 114 reads an Ethernet packet from the packet buffer 111, a length of the Ethernet packet is calculated from packet length information described in a header of an IP packet. The calculated packet length information 91 is transmitted to the LLQ transmission appointed time calculating circuit 130 and the WFQ transmission appointed time calculating circuit 140. In the LLQ transmission appointed time calculating circuit 130 and the WFQ transmission appointed time calculating circuit 140 which have received the packet length information 91, for example, the following calculation is performed so that a transmission interval used for transmission appointed time calculation is decided. Transmission Interval=(Minimum Ethernet Packet Transmission Interval based on Contracted Bandwidth)×(Transmission Ethernet Packet Length)/(Minimum Ethernet Packet Length)

In this manner, the transmission interval is normalized by the minimum Ethernet packet length. Accordingly, a time until transmission of a next packet can be set to be short in the case where an Ethernet packet short in packet length has been transmitted. On the other hand, a time until transmission of a next packet can be set to be long in the case where an Ethernet packet long in packet length has been transmitted.

In the mode for carrying out the invention, a conceptual model of a leaky bucket 1503 in FIG. 7A is used as a new model for the leaky bucket model. The leaky bucket 1503 is different from the aforementioned ATM-forum leaky bucket but has two thresholds, i.e. a threshold (first threshold) 1501 for the LLQ (k) and a threshold (second threshold) 1509 for the WFQ (k).

A hole is formed in the leaky bucket 1503 so that water leaks from the leaky bucket 1503 continuously by a water quantity corresponding to the contracted bandwidth of the VLL (water leakage 1502). In addition, a water quantity 1505 corresponding to the packet length of the transmitted packet is poured into the leaky bucket 1503. For example, the leaky bucket 1503 is provided for each VLL. The water level of the bucket 1503 of each VLL can be stored correspondingly to the LLQ identification number and the WFQ identification number in the LLQ sorting information memory 137 and the WFQ sorting information memory 147 (with reference to FIGS. 5 and 6). The water level of the bucket may be stored in an appropriate memory correspondingly to the VLL identifier.

A transmission appointed time for the LLQ or WFQ and a water level after transmission are calculated in accordance with an algorithm of FIG. 7B.

First, an LLQ algorithm will be described. When the water level after transmission does not exceed the threshold 1501 for the LLQ (k), the LLQ transmission appointed time is set to be the present time so as to be written together with the water level after transmission in the LLQ sorting information memory 137. On the other hand, when the water level after transmission exceeds the threshold 1501, the LLQ transmission appointed time is calculated to be a future time that the water level is not larger than the threshold 1501, so that the calculated LLQ transmission appointed time is written together the water level after transmission in the LLQ sorting information memory 137. In this manner, when there is still a space in the water level relative to the threshold, transmission can be performed without causing any latency period. When there is no space left, the LLQ exceeds the estimated bandwidth so that a time for complying with the allocated bandwidth is calculated so that the packet can just wait for transmission until the calculated time.

Even when a WFQ packet cannot be transmitted immediately based on a result of comparing the water level of the bucket 1503 with the threshold 1509 of the bucket 1503 for the WFQ packet, if the next packet is an LLQ packet and there is still a space left in the water level because the threshold 1501 is set at a high value, the LLQ packet can be transmitted. This judgment performs the order of priorities in all the LLQs in next LLQ sorting 415. In the case where the priority is high, transmission of the LLQ in a next cycle 409 is permitted while the WFQ is held. The bucket 1503 for the LLQ and the bucket 1503 for the WFQ are the same. Accordingly, when a packet from any one of the LLQ and the WFQ in one and the same VLL is transmitted, the water level is increased by the packet so that the bandwidth is consumed. Thus, there may be a fluctuation caused by priority transfer of the LLQ packet, but bandwidth service in compliance with the contracted bandwidth as the whole of the VLL can be offered.

A WFQ algorithm will be described as follows. When the water level after transmission does not exceed the threshold 1509 for the WFQ (k), the WFQ transmission appointed time is set to be the present time so as to be written into the WFQ sorting information memory 147. On the other hand, when the water level after transmission exceeds the threshold 1509, the WFQ transmission appointed time is calculated to be a time that the water level after transmission is not larger than the threshold 1509, so that the calculated WFQ transmission appointed time is written into the WFQ sorting information memory 147. Even when an LLQ packet of one and the same VLL is transmitted, the water level is increased by the packet. Accordingly, when the next packet is a WFQ packet, transmission time of the WFQ packet is affected by the increase in the water level (a possibility that transmission of a next packet is judged to exceed the threshold is increased), so that the WFQ transmission bandwidth is reduced by the LLQ packet. As a result, the VLL bandwidth (the sum of the LLQ bandwidth and the WFQ bandwidth) is equivalent to the water quantity 1502 in accordance with the contracted bandwidth (413 in FIG. 4).

(6) Sorting Process (at the Packet Transmitting Time)

Details of sorting are absolutely the same as that at the packet receiving time. When the packet transmission appointed time is corrected, there is a possibility that the provisional transmission LLQ may be changed so that sorting is performed in the LLQ binary tree sorting circuit 136 (415 in FIG. 4).

The aforementioned processes (1) to (6) are performed within one packet processing time and the routine of processing repetitively starts from the process (1) again.

Next, a method for managing the LLQ sorting information and the WFQ sorting information will be described with reference to FIGS. 5 and 6. The number of LLQs/WFQs which can be supported is hereinafter set at M (=$2^m$). The case for the LLQs in FIG. 5 will be first described.

The relations between various elements of an LLQ binary tree and addresses of the LLQ sorting information memory 137 are shown below. Assume that each address is indicated by a binary number (m+1 bits).

[1] An address corresponding to the root of the binary tree is Address 000 . . . 001.

[2] An address of the parent for an element in Address xyy . . . yyz is Address 0xy . . . yyy. Addresses of two children for the element in Address xyy . . . yyz are yyy . . . yz0 and yyy . . . yz1.

When information is stored in accordance with the aforementioned rules [1] and [2], addresses corresponding to leaves of the binary tree are stored in Addresses 100 . . . 000 to 111 . . . 111 ($2^m$=M addresses in total). When addresses of the memory are managed in accordance with the aforementioned rules, an address generating circuit for memory access required for sorting can be formed easily. That is, a subject to be compared with Address xyy . . . yyz is information stored in Address xyy . . . yy(z') ((z') indicates the inversion of "0"←→"1" of z). A result of the comparison is written into Address 0xy . . . yyy. Accordingly, sorting of the M elements can be performed by m arithmetic shift operations and m inversion operations. A memory map of the LLQ sorting information memory 137 in the case of 8 LLQs (m=3) is shown in FIG. 5 by way of example. As described above, the LLQ identification numbers 500, the LLQ transmission appointed times 501 and the VLDs 502 of the LLQs are stored in the LLQ sorting information memory 137. Description about WFQs in FIG. 6 is the same.

Although an example in which there are two priority classes (i.e. LLQ and WFQ) in one VLL has been described in the aforementioned Embodiment 1, the Embodiment can be easily expanded to a shaping circuit provided with two or more priority classes and is also effectively similarly.

Although the case in which VLLs are bundled to one line has been described above by way of example, the number of VLLs may be one. In addition, the LLQ sorting information memory and the WFQ sorting information memory may be constituted by one memory. When, for example, the number of VLLs is one, the LLQ sorting information memory and the WFQ sorting information memory may be constituted by one memory in which LLQ transmission appointed times, WFQ transmission appointed times and water levels of buckets are stored.

(Ethernet Switch)

The case where the traffic shaping device according to the mode for carrying out the invention is applied to an Ethernet transmission terminal has been described in the aforementioned example. As described above, the traffic shaping device may be installed in any important point in a network such as a relay node from a private network to a public network, in addition to the Ethernet transmission terminal (Embodiment 2).

Figure 9:
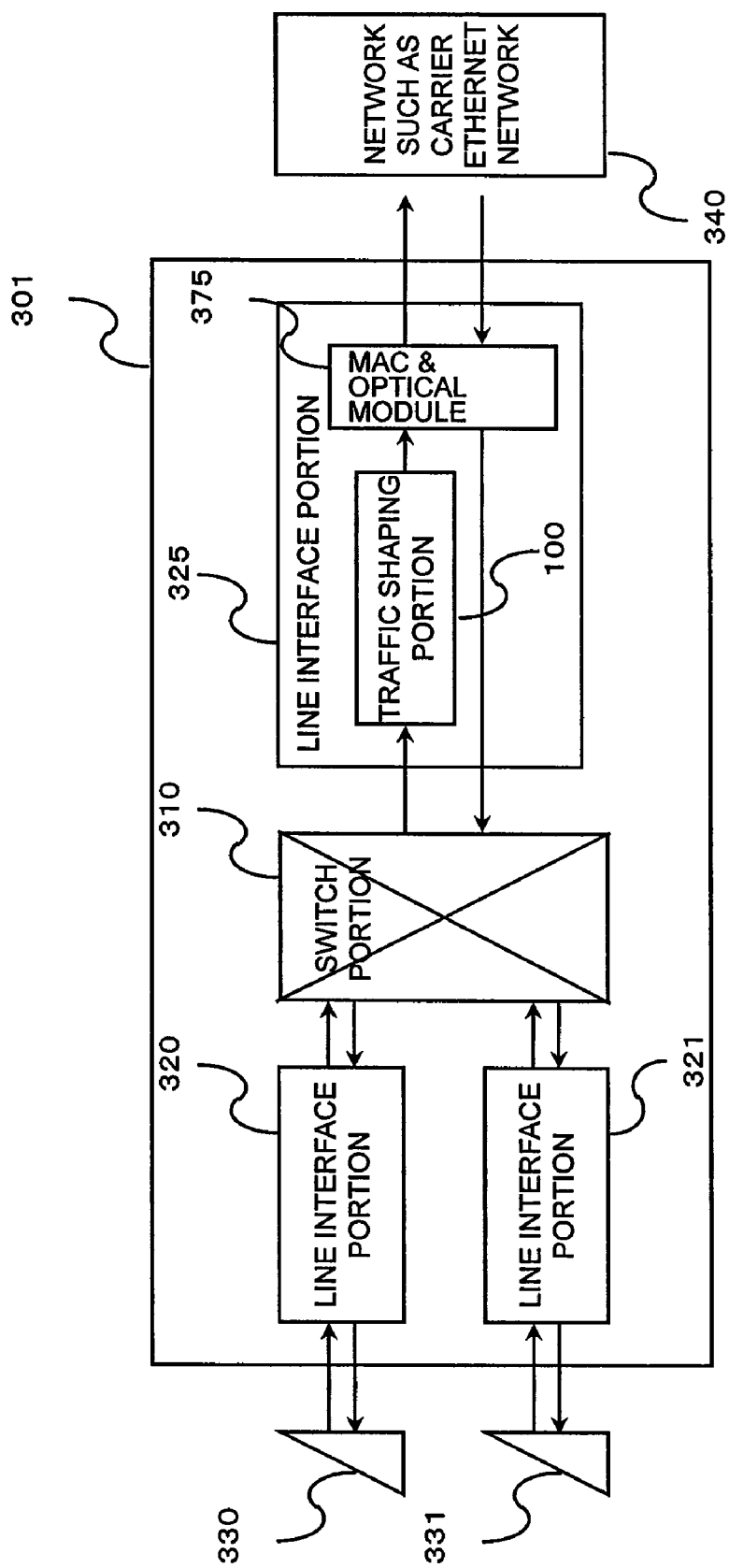
FIG. 9 is a configuration diagram in which a traffic shaping device according to the invention is applied to an Ethernet switch 301 connected to a carrier Ethernet network 340.

FIG. 9 shows a configuration diagram in which the traffic shaping device according to the mode for carrying out the invention is applied to an Ethernet switch 301 connected to a carrier Ethernet network 340.

For example, the Ethernet switch 301 has line interface portions 320 and 321 to Ethernet terminals 330 and 331, a switch portion 310, and a line interface portion 325 to the carrier Ethernet network 340. The line interface portion 325 has a traffic shaping portion 100 corresponding to the carrier Ethernet network and an MAC & optical module 375.

For example, a first VLL is set from the Ethernet terminal 330 to the network and a second VLL is set from the Ethernet terminal 331 to the network. A traffic shaping portion 100 transfers each packet from each of the terminals to the network in accordance with a transmission bandwidth of each VLL, and LLQ/WFQ.

A trunk-type traffic shaping device in which traffic shaping of lines is performed by one traffic shaping device will be described as another example of the mode for carrying out the invention (Embodiment 3).

Figure 10:
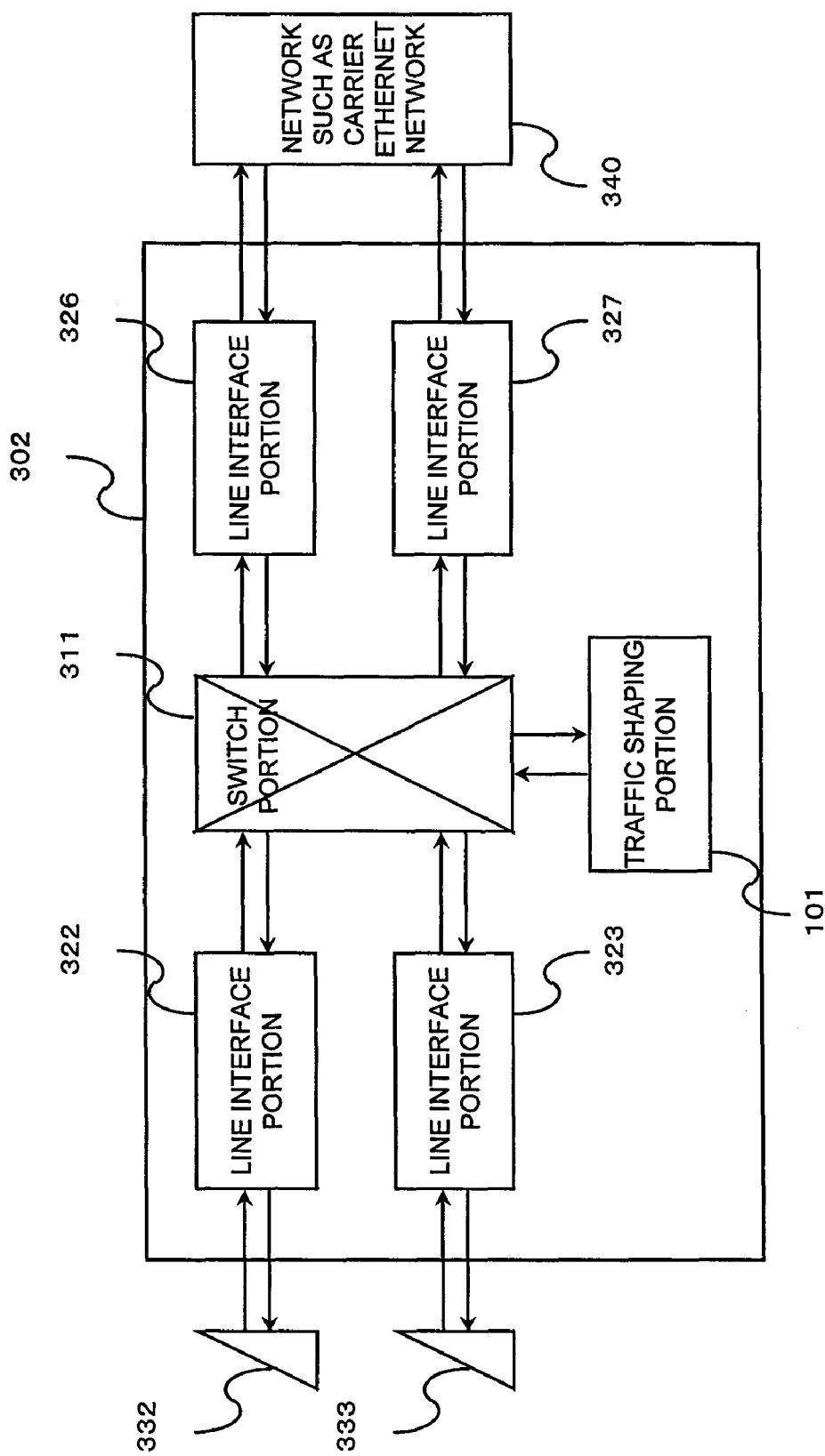
FIG. 10 is an example in which an Ethernet switch is formed as a trunk-type traffic shaping device.

FIG. 10 shows an example in which an Ethernet switch is formed as the trunk-type traffic shaping device.

Packet flows generated by terminals 332 and 333 are inputted to a switch portion 311 through line interface portions 322 and 323 of an Ethernet switch 302. Also when one of output lines has been decided by the switch portion 311, each packet is temporarily transferred to a traffic shaping portion 101. Operations the same as the various processes (such as VLL sorting) of the traffic shaping portion 100 according to Embodiment 1 are made in the traffic shaping portion 101. Each packet outputted from the traffic shaping portion 101 is transmitted through the switch portion 311 again to a carrier Ethernet network 340 from a line interface portion 326 or 327 of each output line. When the packet outputted from the traffic shaping portion 101 is accumulated in a packet buffer of the switch, the traffic shaping process performed by the traffic shaping portion 100 becomes meaningless. Thus, the packet transmitted from the traffic shaping portion 101 needs to be transferred to the network with the highest priority.

A traffic shaping device for controlling a wireless bandwidth, in place of a system for controlling bandwidths in a line, will be descried as another example of the mode for carrying out the invention (Embodiment 4).

Figure 11:
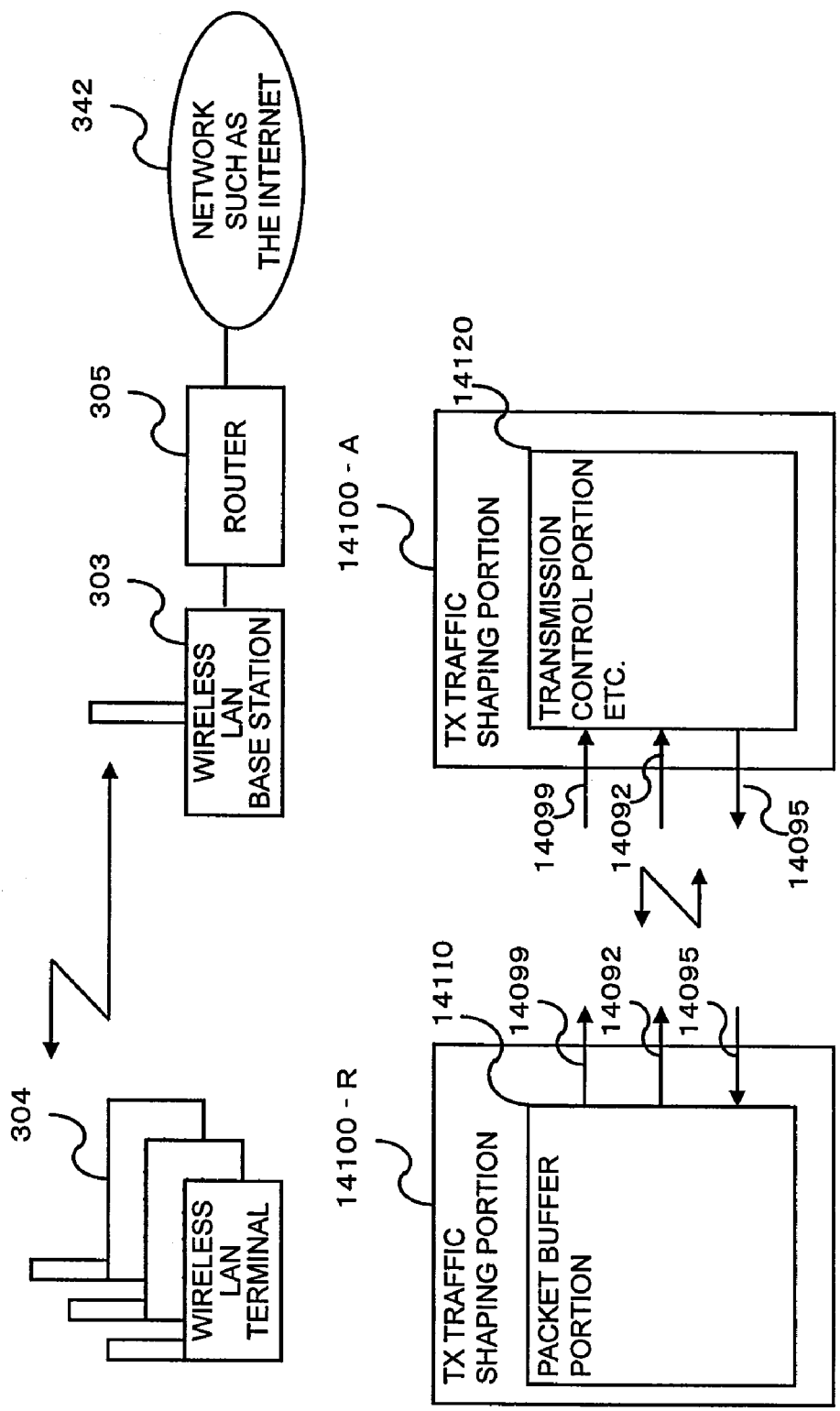
FIG. 11 is a configuration example of a traffic shaping device which performs traffic shaping while a wireless bandwidth between a wireless LAN base station 303 and wireless LAN terminals 304 is shared by bandwidth control among the wireless LAN terminals 304.
Figure 12:
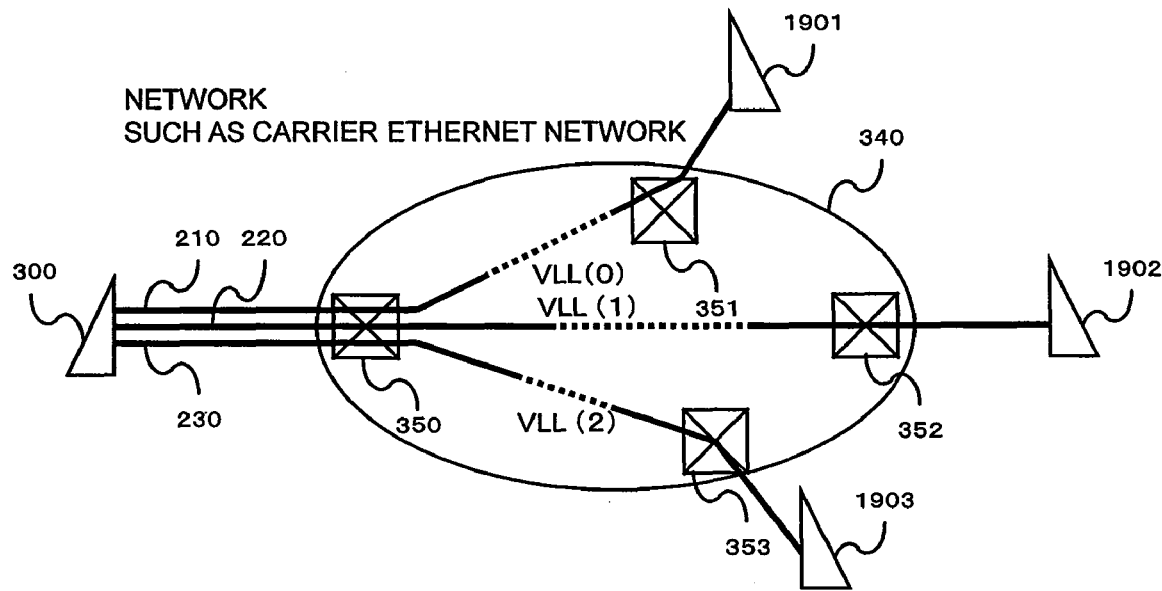
FIG. 12 is a network for providing communication service to transmission terminals (user terminals) each provided with a traffic shaping circuit.

FIG. 11 shows a configuration example of the traffic shaping device which performs traffic shaping while a wireless bandwidth between a wireless LAN base station 303 and wireless LAN terminals 304 is shared by bandwidth control among the wireless LAN terminals 304.

The wireless LAN base station 303 is connected to the Internet 342 through a router 305. In this case, a bandwidth in a direction from the wireless LAN base station 303 toward the wireless LAN terminals 304 (hereinafter referred to as Rx direction) can be controlled by the wireless LAN base station 303. Thus, the wireless LAN base station 303 may be configured to have the same function as that of the traffic shaping device according to Embodiment 1. The whole of transmission requests in the bandwidth in a reverse direction from the wireless LAN terminals 304 toward the wireless LAN base station 303 (hereinafter referred to as Tx direction) cannot be grasped by the existing wireless LAN terminals. Since the wireless bandwidth is shared, an arbitration function (equivalent to the traffic shaping portion 100 according to Embodiment 1) for performing bandwidth control in the Tx direction is required. This arbitration function is achieved separately by Tx traffic shaping portions 14100-R and 14100-A.

That is, each wireless LAN terminal 304 has the traffic shaping portion 14100-R as the traffic shaping portion in the line interface portion (equivalent to 324 in FIG. 2). The traffic shaping portion 14100-R has a packet buffer 14110 (equivalent to the packet buffer portion 110 in FIG. 1).

A line interface portion (equivalent to the line interface portion 324) of the wireless LAN base station 303 has the traffic shaping portion 14100-A as a function for performing arbitration of packet transmission requests from the wireless LAN terminals 304 toward the wireless bandwidth. The traffic shaping portion 14100-A has all the functions of the traffic shaping portion 100 in FIG. 1 except the packet buffer portion 110. The traffic shaping portion 14100-A performs bandwidth control over VLLs (LLQs and WFQs) and bandwidth control among the wireless LAN terminals 304 (equivalent to Embodiment 3). Between the Tx traffic shaping portions 14100-R and 14100-A, for example, there are not only the bandwidth for packet transmission but also a wireless control channel bandwidth for exchanging packet transmission requests and permissions. On the channel, each packet reception signal 14099 (equivalent to a packet reception signal 99), each packet transmission signal 14092 (equivalent to a packet transmission signal 92), and each transmission permission signal 14095 (equivalent to a transmission permission signal 95) are exchanged. The Tx traffic shaping portion 14100-A grasps the statuses of the Tx traffic shaping portions 14100-R of the wireless LAN terminals 304 by the packet reception signals 14099 and the packet transmission signals 14092 sent from the Tx traffic shaping portions 14100-R. Then, the Tx traffic shaping portion 14100-A decides a transmission request to be permitted by an arbitration mechanism inside a transmission control portion, and sends transmission permission to a selected VS (priority class) of a selected VLL of a selected wireless LAN terminal 304 by the transmission permission signal 14095.

For example, the transmission control portion may be formed to transmit the transmission permission signal 14095 to the selected wireless LAN terminal 304. For example, the transmission control portion may transmit the transmission permission signal 14095 to all of the wireless LAN terminals 304 so that a packet buffer read control circuit of each of the wireless LAN terminals 304 judges whether this transmission permission signal is for its own or not.

Although the wireless bandwidth for packet transmission (Tx direction) has been described above, the wireless bandwidth for packet transmission (Tx direction), the wireless bandwidth for packet reception (Rx direction), and the aforementioned control channel bandwidth may be shared. In this case, Tx direction bandwidth arbitration and Rx direction bandwidth arbitration are integrated and performed in the transmission control portion.

Although the case where the wireless LAN is applied to Ethernet packet has been described in the mode for carrying out the invention, the mode for carrying out the invention is not specialized in the Ethernet but can perform traffic shaping on packet communication in a wireless bandwidth shared by cell phones, satellite communication, etc., in the same manner so as to obtain the same effect.

Figure 13:
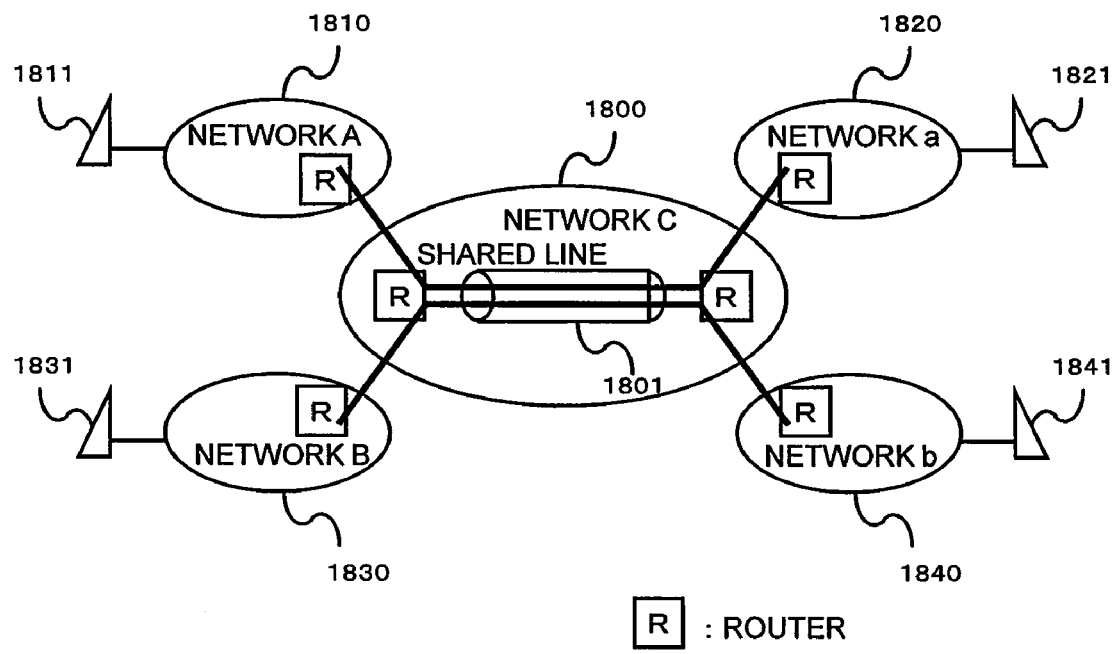
FIG. 13 is a view showing the case where a shared line is used to connect networks and contracted in accordance with the networks.

Further, the case where a shared line such as the Internet etc. is used to connect a plurality of networks and contracted in accordance with each of the networks will be conceived as a further example of network for carrying out the invention. FIG. 13 shows a network of such a type (Embodiment 5).

In FIG. 13, a network A 1810 and a network a 1820 are possessed by a provider A. Terminals 1811 and 1821 are regarded as users of the provider A. Similarly, a network B 1830 and a network b 1840 are possessed by a provider B. Terminals 1831 and 1841 are regarded as users of the provider B. The network A, the network a, the network B and the network b are connected to a network C 1800 by routers R respectively. The provider A and the provider B have contracted transmission bandwidths with the network C respectively. In the network C, a shared line 1801 is shared and used by the provider A and the provider B. When the terminal 1811 and the terminal 1821 perform communication with each other or the terminal 1831 and the terminal 1841 perform communication with each other in such a network environment, it is preferable that, while the contracted bandwidth with the shared line are complied with in an input port of the shared line 1801 (equivalently to a VP of fixed bandwidth service ATM), the bandwidth can be managed (equivalently to a VC of the ATM) by giving priorities to packets which are being transferred in the contracted bandwidth (for example, TELENT packets are given priority over email packets. Incidentally, priority information may be reflected onto a TOS byte of each header of each IP packet.). Various operation modes such as sharing of a line by providers, sharing of a long-distance communication line between companies, and traffic management in accordance with each division in one and the same company may be conceived as the modes for effectively using such a bandwidth.

Here, the bandwidth outputted to one and the same line is classified to two hierarchical layers, i.e. VLL and VS. The VLL has been described as a contracted bandwidth (service contract relation between a network administrator and each user etc.) unit for the user. The VS has been described as a bandwidth control unit for performing control over the contracted bandwidth in accordance with a request of the user so that the user can more effectively use the contracted bandwidth. The mode for carrying out the invention is not limited to two hierarchical layers but can be easily expanded to a large number of hierarchical layers.

For example, the invention can be used in an industry relating to a traffic shaping circuit etc. in a fixed- or variable-length packet transmission terminal or a network node (such as a router). Particularly, the invention is suitable for a service edge node for performing service requiring (weighted) fairness of each user in the bandwidth, inclusive of VOICE service requiring transfer quality of low latency fluctuation.

The invention claimed is:

1. A network apparatus comprising:
a storing portion for managing an amount of transmission of received packets for each of plural users, for one of a first priority and a second priority that is set to each of the packets, a predetermined threshold of the amount of transmission being determined previously for the packets having the second priority; and
a transmission appointed time calculation portion that, for each of the users, when in an exceeding threshold state in which the amount of transmission of the received packets managed by the storing portion exceeds the threshold, sets transmission appointed time to present time when receiving a packet having the first priority and, when in a state other than the exceeding threshold state, delays the transmission appointed time in accordance with the amount of transmission managed by the storing portion when receiving a packet having the second priority, the amount of transmission including the amount of transmission of packets having the first priority which has been transmitted at previous times in the exceeding threshold state.

2. The network apparatus according to claim 1 wherein,
the storing portion, after transmitting the received packet, increases the amount of transmission in accordance with the packet transmitted, and
the transmission appointed time calculation portion, when newly receiving a packet having the second priority right after the transmission of the packet having the first priority, delays the transmission appointed time in accordance with an increment amount of the amount of transmission at the storing portion due to the packet which has the first priority and has been transmitted at a last time.

3. The network apparatus according to claim 2 further comprising:
a buffer which has queue areas for priorities of the packets of users and stores the received packets;
a sorting portion which sorts the received packets in all queue areas in order of transmission in accordance with a calculation result of the transmission appointed time by the transmission appointed time calculation portion; and
a transmission control portion which transmits packets in the order of transmission sorted by the sorting portion.

4. The network apparatus according to claim 3 wherein,
the sorting portion sorts the packets to be transmitted by a binary tree.

5. The network apparatus according to claim 3 wherein,
the sorting portion re-sorts the order of transmission of the packets with each packet reception.

6. The network apparatus according to claim 3 wherein,
the sorting portion re-sorts the order of transmission of the packets with each packet transmission.

7. A network apparatus comprising:
a storing portion for managing an amount of transmission of received packets for each of users, thresholds of the amount of transmission being determined previously for the packets having the first priority and the packets having the second priority respectively, the threshold for the packet having the first priority being larger than the threshold for the packet having the second priority; and
a transmission appointed time calculation portion that sets transmission appointed time to present time when receiving a packet having the first priority in a case where the amount of transmission of the received packets managed by the storing portion does not exceed the threshold for the packet having the first priority, even if the amount of transmission of the received packets exceeds the threshold for the packet having the second priority, and
wherein
the storing portion, after transmitting the received packet, increases the amount of transmission in accordance with the packet transmitted,
the transmission appointed time calculation portion, when newly receiving a packet having the second priority right after the transmission of the packet having the first priority, delays the transmission appointed time in accordance with an increment amount of the amount of transmission at the storing portion due to the packet which has the first priority and has been transmitted last time, and
a transmission appointed time calculation portion that sets transmission appointed time to present time when receiving a packet having the first priority in a case where the amount of transmission of the received packets managed by the storing portion does not exceed the threshold for the packet having the first priority, even if the amount of transmissions of the received packets exceeds the threshold for the packet having the second priority.

8. The network apparatus according to claim 7 wherein,
the transmission appointed time calculation portion, when newly receiving a packet having the first priority right after the transmission of the packet having the first priority, delays the transmission appointed time in accordance with an increment amount of the amount of transmission at the storing portion due to the packet which has the first priority and has been transmitted at a last time in a case where the amount of transmission of the received packets managed by the storing portion exceeds the threshold for the packet having the first priority.

* * * * *